United States Patent [19]

Outzen

[11] Patent Number: 4,871,300
[45] Date of Patent: Oct. 3, 1989

[54] COMPRESSOR SPRING MOUNTING

[75] Inventor: Svend E. Outzen, Sonderborg, Denmark

[73] Assignee: Danfoss A/S, Nordborg, Denmark

[21] Appl. No.: 218,849

[22] Filed: Jul. 14, 1988

[30] Foreign Application Priority Data

Aug. 12, 1987 [DE] Fed. Rep. of Germany ....... 3726758

[51] Int. Cl.$^4$ ............................................. F04B 39/12
[52] U.S. Cl. .................................. 417/363; 248/623; 248/638; 248/573; 267/169
[58] Field of Search ........... 417/363; 248/622, 623 X, 248/638 X, 573 X; 267/169 X

[56] References Cited

U.S. PATENT DOCUMENTS

| 2,118,150 | 5/1938 | Brinkley | 267/169 X |
| 2,520,937 | 9/1950 | Kennard, Jr. | 267/169 |
| 3,030,056 | 4/1962 | Rogers | 248/638 X |
| 3,531,069 | 9/1970 | Dubberley | 248/638 X |
| 4,549,859 | 10/1985 | Andrione et al. | 417/363 |

FOREIGN PATENT DOCUMENTS 57-059077  4/1982  Japan ................... 417/363

Primary Examiner—Carlton R. Croyle
Assistant Examiner—Eugene L. Szczecina, Jr.
Attorney, Agent, or Firm—Wayne B. Easton; Clayton R. Johnson

[57] ABSTRACT

This invention relates to an insert freely displaceable in a coil spring that at opposite ends abut against spring support formed in a motor compressor unit capsule and a spring support formed by a stator plate. The spring supports project into the opposite ends of the spring to extend toward one another. The opposite ends of the insert are recessed to be of shapes generally corresponding to the adjacent parts of the supports. The insert serves as a transport abutment and permits lateral movement without excessively deforming of the spring.

14 Claims, 2 Drawing Sheets

COMPRESSOR SPRING MOUNTING

The present invention relates to a compressor spring mounting, particular for encapsulated refrigerators, comprising an upper and a lower spring support which are disposed at parts of the compressor movable relatively to each other in at least two dimensions and at a base, and a helical spring disposed between the two spring supports.

Such a spring mounting is known from DE-AS 26 17 388, U.S. Pat. No. 4,106,881. The two spring supports which are secured to the stator of the motor-compressor unit (hereinafter referred briefly as the "compressor") and to the capsule have a cylindrical retaining portion followed by a conical extension. The spring is pushed over the supports. The supports serve as transport abutments, i.e., they are intended to prevent that upon strong vertical loading of the stator as occurring during transport, the spring is so intensively compressed that it could become damaged or destroyed.

What is disadvantageous in this spring mounting is that it can become damaged if lateral forces are exerted on the stator at the same time as a vertical force acts on it. This situation occurs if the compressor is not exactly held in its normal position but, for example upon unloading, is roughly deposited on the ground by one edge. The compressor is displaced laterally in the capsule and the two spring supports will then no longer meet each other but rather pass each other, and this can lead to dislodgement, destruction or at least permanent damage of the spring. The compressor must therefore be secured against excessive lateral movement in the capsule in some other manner.

A similar compressor spring mounting for refrigerators is known from U.S. Pat. No. 3,075,686. The lower spring support is formed by a projection formed in the base of the capsule. Here, again, the spring mounting can become damaged upon combined vertical and horizontal loading.

It is therefore the problem of the present invention to provide a compressor spring mounting which, even on relative lateral displacement between the compressor and mounting, can still take up forces in the vertical direction without the spring being damaged.

This problem is solved in that the interior of the helical spring is provided with a movable insert.

The movable insert on the one hand serves as a transport abutment which the spring supports can strike when the compressor moves towards the base. On the other hand, it permits lateral movement of the compressor relatively to the mounting without excessively deforming the helical spring. If the now laterally displaced compressor is moved downwardly, the force of the upper spring support is transmitted through the insert to the lower spring support without the spring becoming damaged by the support.

For production reasons, it is advantageous for the insert to be connected to neither of the spring supports but to be freely movable between the upper and lower supports. After placement of one end of a helical spring, the insert is simply inserted in the spring, whereupon the other end of the spring can be located. If the spring becomes inclined through lateral displacement of the compressor, the insert necessarily becomes likewise inclined and it stabilises the spring.

In a further advantageous embodiment, the insert is supported on one of the spring supports so that it can pivot in all directions. This permits exact guiding of the insert during displacement of the compressor.

The spring supports may be in the form of confronting projections on to which the helical spring is simply pushed during assembly, this making assembly very simple.

It is of particular advantage if at least one end of the insert comprises a recess into which the associated projection of the spring support can move and if this recess has substantially the same shape as the projection of the spring support. The impact caused by the moving compressor can then be readily transmitted to the base even when the compressor is laterally displaced, i.e., when the insert is inclined.

For production reasons, it may be advantageous if the spring supports are conical. This facilitates assembly of the spring because it can be more easily pushed onto the spring supports. It is in this case advantageous if the angle between the conical wall of the recess and the longitudinal axis of the insert is larger than the angle between the conical wall and longitudinal axis of the spring supports, i.e., if the cone of the spring supports is steeper than the cone of the recess so that, even with the insert inclined, the spring support can engage in the recess of the insert.

A different advantageous embodiment of the spring mounting comprises spring supports of which at least sections have a hemispherical or spherical segmental shape. Irrespective of the inclination of the insert, the latter will then always have the same contact characteristic with the spring support. In particular, there will be contact over a large area if the radius of the recess is substantially equal to the radius of the spring support. Good results are still obtained if the radius of the recesses is substantially equal to the radius of the spring supports.

For use in a refrigerator, the insert is preferably of a thermoplastic polyester material which is resistant to refrigerant.

The insert can have many shapes. Particularly advantageous shapes are cylindrical and a keg or tub shape with concave external surfaces. If the insert is to increase damping through its friction against the spring, the external diameter of the insert is substantially equal to the internal diameter of the helical spring. In this case, the cylindrical shape is of advantage. If little damping is desired, the keg shape is better because of its smaller contact area with the spring.

To save on material, one can also make the insert with a smaller diameter than the internal diameter of the spring. In this case, it is advantageous for the purpose of centering the insert if the insert has at least three longitudinal ribs which have substantially the same angular spacing from each other. Depending on the thickness of the ribs, the damping can be adapted to that of a solid insert.

To save material but also to prevent the ends of the insert from damaging the spring when the compressor is very much laterally displaced relatively to the base, at least one end of the insert may comprise a concentric section of reduced diameter.

For production reasons, it has proved particularly advantageous for the spring supports to be made in one piece with the compressor mounting or with the base. The spring support can in this case be made without machining, for example by drawing.

The spring mounting according to the invention also permits transport of the compressor to take place under relatively rough conditions. Even careless unloading will not lead to damage of the spring mounting. The insert ensures an adequately large abutment surface upon axial displacement of the compressor even if the compressor has been radially displaced.

There is a reduced danger of the spring supports becoming jammed within the spring and thereby detracting from the resilience of the spring mounting.

The new spring mounting requires relatively little material which, apart from saving costs for material also brings about a saving in weight.

Assembly of the spring mounting is made very simple by the suggested features. Practically no additional tool is required.

To a certain extent, the features of the invention may influence the spring properties, particularly damping, through friction so as to adapt the spring mounting to different operating conditions.

Additional advantages, features and possibilitites of use of the present invention will be evident from the subsidiary claims and from the following description of examples with reference to the drawing, wherein FIG. 1 shows a spring mounting in its rest position;

Figure 1:
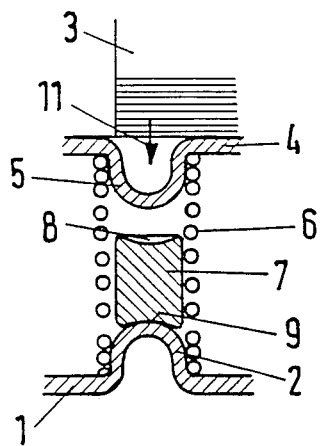

FIG. 1 shows a spring mounting in its rest position. A capsule 1 serves as the base. It comprises a lower spring support 2 of substantially hemispherical shape. A motor-compressor unit shown in outline and hereinafter briefly referred to as the compressor 3 comprises a compressor support 4 which is formed by a stator plate and has an upper spring support 5 formed in it. The spring supports 2 and 5 are made by drawing the base of the capsule 1 or compressor support 4. They have an end surface in the shape of the segment of a sphere. The compressor is supported on the base of the capsule 1 by way of a helical spring 6. The spring 6 is pushed over the upper and lower spring supports 2, 5 and does not have to be secured in any additional manner when it is loaded by the compressor 3.

An insert 7 within the spring 6 is fixed neither to the upper spring support 5 nor to the lower spring support 2 but can move freely between them. The insert 7 is shorter than the spacing between the upper spring support 5 and the lower spring support 2 in their rest position so that there will be adequate spring displacement for operation of the compressor. The compressor can move unhindered along a certain spring path in the direction of the arrow 11.

The insert is in this case cylindrical and has an upper recess 8 at its upper end and a lower recess 9 at its lower end. The recesses 8, 9 have the shape of the segment of a sphere, the radius of the sphere being substantially equal to the sphere radius of the spring supports 2, 5 so that the recesses form a kind of spherical bearing. Accordingly, the insert 7 is supported on the lower spring support 2 so that it can pivot in all directions.

During assembly, insert 7 is inserted in the spring 6 after the spring has been connected to one of the spring supports 2, 5 but before it is connected to the other spring support 5, 2. No special tool is required for insertion.

In a different embodiment, the insert 7 may, for example, be fixed to the lower spring support 2 but so that it can pivot in all directions.

Figure 2A:
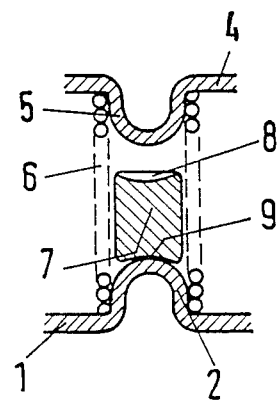
FIGS. 2a and 2b show the spring mounting before and after lateral displacement of the compressor.
Figure 2B:
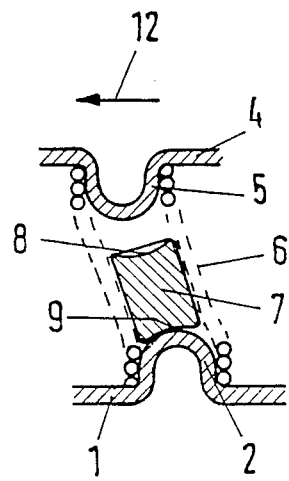

FIG. 2a is similar to FIG. 1 but without the motor-compressor unit and showing the rest position as the starting position. In FIG. 2b, the compressor support 4 has been displaced relatively to the capsule 1 in the direction of an arrow 12. If, without the insert 7, the compressor support 4 would move a large distance, there is the danger that the spring supports 2, 5 slide off each other and dislodge, damage or even destroy the spring 6. The insert 7 takes up the impact of the moving compressor mounting from the upper spring support 5 and transmits it to the lower spring support 2 and thus to the capsule 1. Because of the spherical segmental shapes of the abutment faces between the insert 7 and spring supports 2, 5, there will be a low surface pressure. In addition, the insert 7 cannot deviate or slide off laterally. The spring mounting is therefore maintained even when the compressor 3 is radially or laterally displaced.

Figure 3:
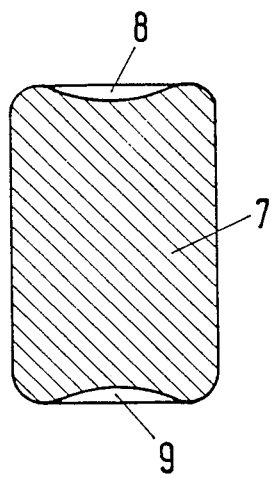
FIG. 3 is a cross-section through an insert.

FIG. 3 is an enlarged cross-section of the simplest form of insert 7, namely cylindrical. The insert consists of a thermoplastic polyester material which is resistant to refrigerants. One can recognise the upper recess 8 and the lower recess 9 with its spherical segmental shape.

Figure 4A:
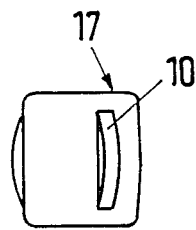
FIGS. 4a and 4b are a side elevation and plan of a different embodiment of insert.
Figure 4B:
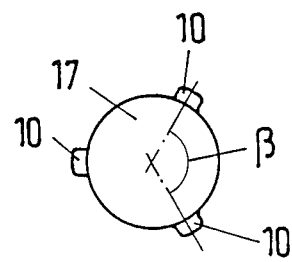

FIGS. 4a and 4b show a modified insert 17 of which the cylindrical body has a reduced diameter. In order that the insert 17 nevertheless remains centered within the spring 6, it has three or more longitudinal ribs 10 equally distributed along the circumference, i.e., having an equal angular spacing $\beta$ relatively to each other.

Figure 5:
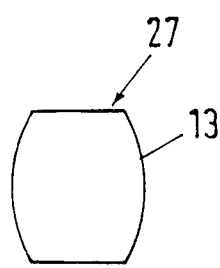
FIGS. 5 to 7 are side elevations of further embodiments of inserts.

FIG. 5 shows a further embodiment of the insert 27 having the shape of a keg with concave, i.e., outwardly bowed, external surfaces 13.

Figure 6:
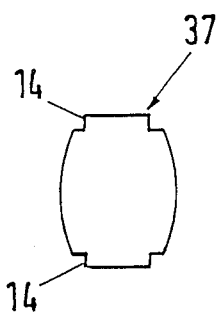
Figure 7:
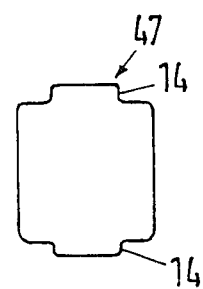

FIGS. 6 and 7 show inserts 37 and 47, respectively, corresponding to those of FIGS. 3 and 5 and provided at both ends with a section 14 of reduced diameter.

Even in the case of the modified inserts, end recesses may be provided to form spherical bearing surfaces.

In FIGS. 1, 2a and 2b, the insert 7 is shown with a diameter less than the internal diameter of the spring 6. In this way, the spring properties, particularly damping, are practically not affected. If such an influence is desired, the diameter of the insert 7 is increased so that it corresponds to the internal diameter of the spring 6 and the insert 7 touches the spring 6. The contact surface between the spring 6 and insert 7 can therefore be of practically any desired shape by selecting an insert shape from FIGS. 3 to 7 and/or by changing the curvature of the exterior 13.

I claim:

1. A compressor spring mounting, comprising a compressor base having a lower spring support, a compressor upper spring support movable relative to the lower spring support in at least two diamensions and spaced therefrom, a helical spring disposed between the upper and lower spring supports in abutting relationship to the spring supports and having an interior, and a movable insert disposed in the spring interior and being elongated in the direction of spacing of the supports from one another and movable away from each of the supports, the insert having at least one arcuately curved recessed end, the spring support adjacent to the recessed end having a portion adjacent to and arcuately curved to generally correspond to the adjacent arcuately curved recessed end to permit the insert pivoting in all directions relative to the support portion when the insert is supported by the support portion, the support portion extending into the spring to be abutable against the insert.

2. A spring mounting according to claim 1, characterized in that the insert is disattached with reference to each of the spring supports.

3. A spring mounting according to claim 1, characterized in that one of the spring supports is defined by a one piece compressor support.

4. A spring mounting according to claim 1, characterized in that one of the spring supports is defined by a one piece compressor mounting that projects toward the other spring support.

5. A spring mounting according to claim 1, characterized in that the insert is formed from a thermoplastic polyester material that is resistant to refrigerants.

6. A spring mounting according to claim 1, characterized in that the insert has a generally cylindrical, axially intermediate portion and an end portion of a smaller diameter than the axial intermediate portion.

7. A spring mounting according to claim 6, characterized in that the insert has a generally cylindrical outer surface.

8. A spring mounting according to claim 1, characterized in that each of the spring supports projects into the spring toward the other spring support.

9. A spring mounting according to claim 8, characterized in that the insert has at least one recessed end, the spring support adjacent to the recessed end having a portion adjacent to and corresponding to the adjacent recessed end.

10. A compressor spring mounting, comprising a compressor base having a lower spring support, a compressor upper spring support movable relative to the lower spring support in at least two dimensions, a helical spring disposed between the upper and lower spring supports in abutting relationship to the spring supports and having an interior, and a movable insert disposed in the spring interior, the insert having a generally cylindrical surface and at least three longitudinal ribs extending radially outwardly of the cylindrical surface.

11. A compressor spring mounting, comprising a compressor base having a lower spring support, a compressor upper spring support movable relative to the lower spring support in at least two dimensions, a helical spring disposed between the upper and lower spring supports in abutting relationship to the spring supports and having an interior, and a movable insert disposed in the spring interior, at least one of the spring supports and the recessed end being generally conical.

12. A spring mounting according to claim 11, characterized in that the spring supports and insert have a longitudinal axis, that the recessed end is defined by a generally conical insert wall and that the angle between the conical wall and the longitudinal axis of the insert is larger than the angle between the conical wall and the longitudinal axis of the spring supports.

13. A compressor spring mounting, comprising a compressor base having a lower spring support, a compressor upper spring support movable relative to the lower spring support in at least two dimensions, a helical spring disposed between the upper and lower spring supports in abutting relationship to the spring supports and having an interior, and a movable insert disposed in the spring interior, at least one spring support and the adjacent recessed end being of substantially spherical shaped segments.

14. A spring mounting according to claim 13, characterized in that the radii of curvature of the spherical segmental shapes are substantially equal.

* * * * *